No. 752,550. Patented February 16, 1904.

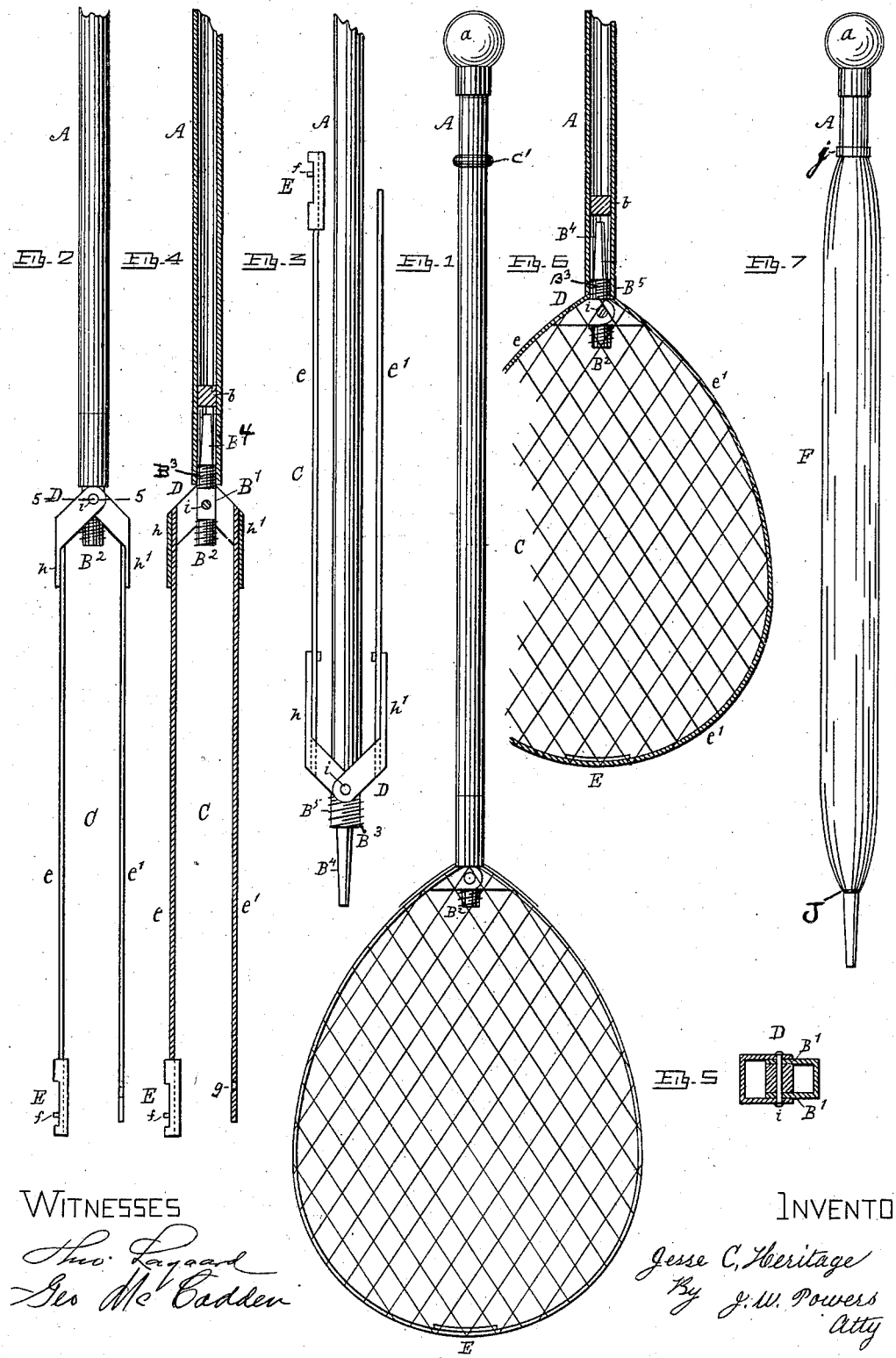

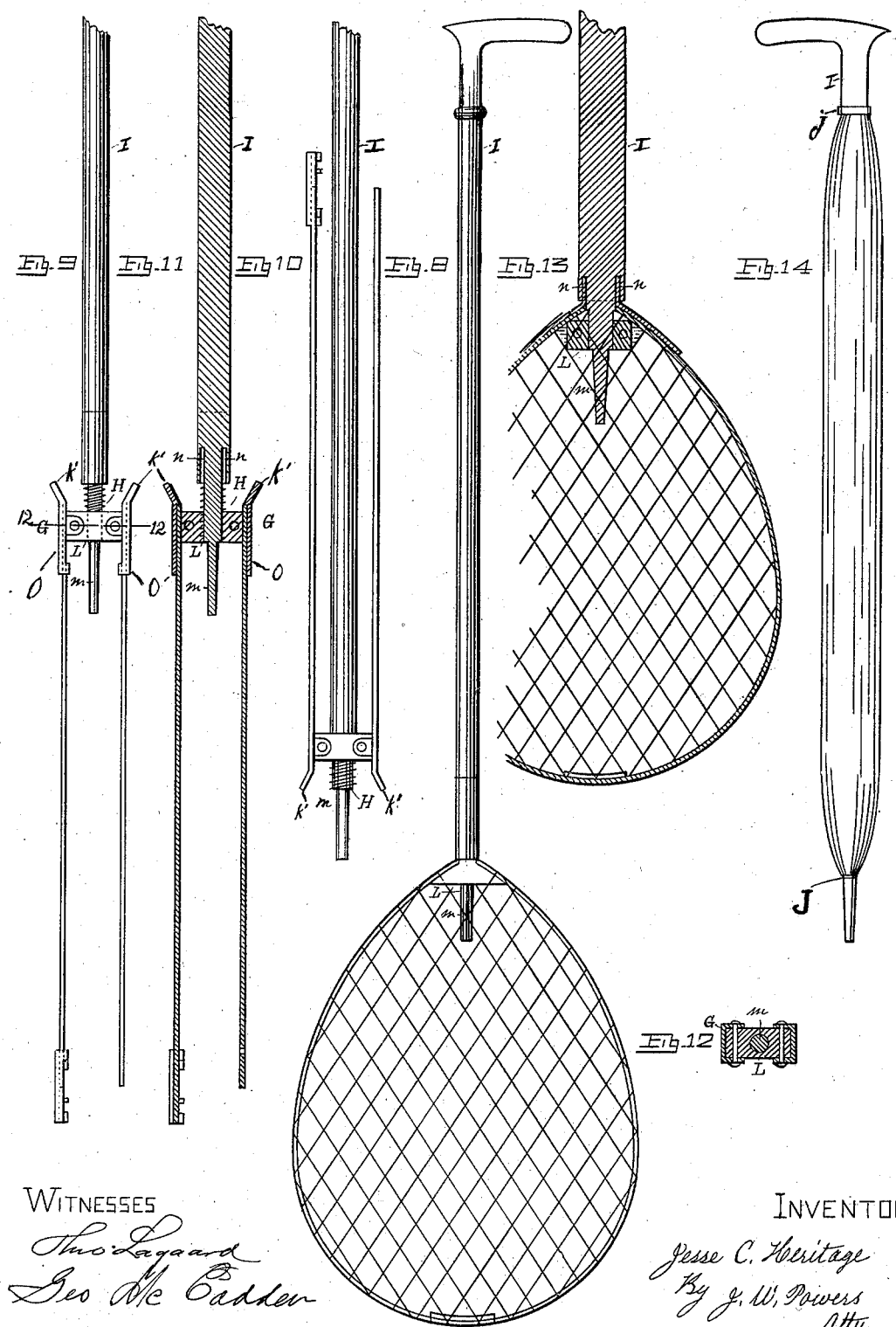

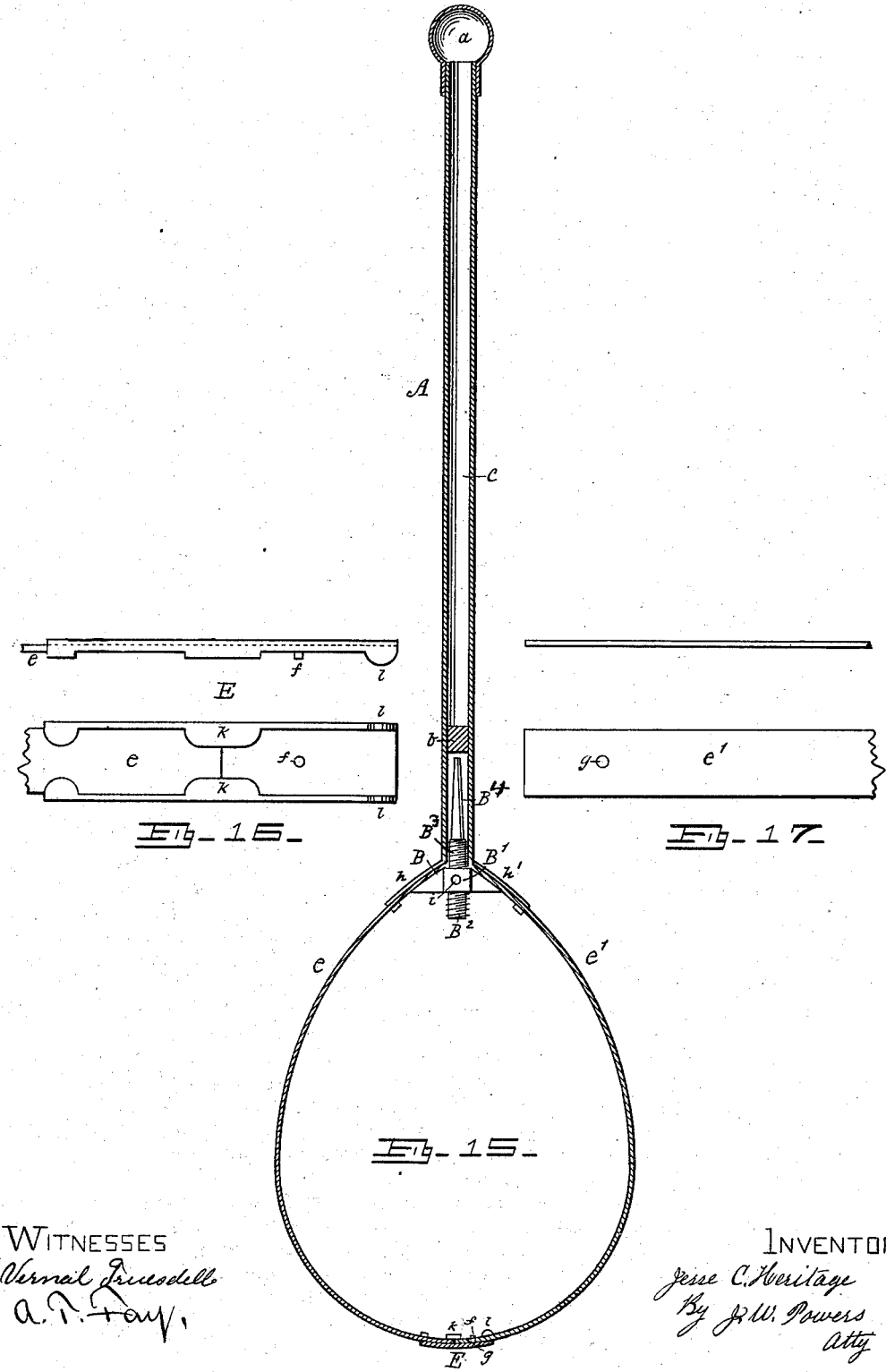

UNITED STATES PATENT OFFICE.

JESSE C. HERITAGE, OF MINNEAPOLIS, MINNESOTA.

LANDING-NET.

SPECIFICATION forming part of Letters Patent No. 752,550, dated February 16, 1904.

Application filed January 15, 1902. Serial No. 89,833. (No model.)

*To all whom it may concern:*

Be it known that I, JESSE C. HERITAGE, a citizen of the United States, residing at No. 1015 Nicollet avenue, Minneapolis, county of Hennepin, and State of Minnesota, have invented new and useful Improvements in Fishermen's Landing-Nets, of which the following is a specification, reference being had to the accompanying drawings.

My invention relates to sporting goods, and has for its objects, first, the production of a light, strong, and convenient landing-net which (when not in use as such) may be collapsed, rolled, and covered, thereby having the appearance of an umbrella, and which may be used as a walking-stick; second, the production of a landing-net having a hollow handle, thus providing a buoyancy-chamber, whereby it will float upon the water, and, third, the production of a landing-net having a receptacle wherein may be stored the disjointed sections of fishing-rods.

To these ends my invention consists of the device shown in the accompanying drawings, in which—

Figure 1 is a top view of my net when distended and ready for use; Fig. 2, the same collapsed and the net removed; Fig. 3, the the same with the handle A reversed; Fig. 4, a longitudinal section; Fig. 5, a cross-section of Fig. 2, taken on the line 5 5; Fig. 6, a longitudinal section of a portion of the net and handle; Fig. 7, my device collapsed and covered to simulate an umbrella; Fig. 8, a top view of a modified construction; Fig. 9, the same collapsed and the net removed; Fig. 10, the same with the handle reversed; Fig. 11, a longitudinal section; Fig. 12, a cross-section of Fig. 9, taken on the line 12 12; Fig. 13, a longitudinal section of a portion of the net and handle; Fig. 14, my modified device collapsed and covered to simulate an umbrella. Fig. 15 is a longitudinal section; Fig. 16, a front and side view of the clasp, and Fig. 17 the same of the outer end of one of the bows.

Similar letters refer to similar parts throughout the several views.

The handle A, I fashion of metal tubing (preferably aluminium) for reasons which will herein be set forth. Its upper end is furnished with a knob $a$, which should fit the tubular handle air-tight, and its lower portion with an air-tight plug $b$, thus forming an air-chamber $c$, as shown in Fig. 15. That portion of its lower end extending below the plug $b$ is interiorly threaded to receive the exteriorly-threaded ends of a coupling B, hereinafter described.

The net-frame C consists of two metal bars $e$ and $e'$, (steel being best adapted to the purpose,) which bars when united and distended form the hoop or loop upon which the twine is woven to form the net. These metal bars $e$ and $e'$ are permanently united at their upper ends by means of the hinge-joint D. The free lower end of one of these bars $e$ is furnished with a clasp E, which clasp is adapted to receive and to hold temporarily the free end of its fellow strip $e'$. This clasp E is provided with a laterally-extending pin $f$, adapted to enter a lateral perforation $g$ of the bar $e'$ when the said bars shall have been deflected and clasped to form the before-mentioned hoop or loop.

The hinge-joint D consists of three principal parts—viz., the two straps $h$ and $h'$, affixed to the bars $e$ and $e'$ and to the coupling B, hereinbefore mentioned.

The coupling B consists of a laterally-pierced middle portion B', having parallel sides, a short longitudinally-extending and exteriorly-threaded portion $B^2$, adapted to enter the interiorly-threaded lower end of the handle A, and a longer longitudinally-extending portion $B^3$, a reduced part $B^4$ of which is adapted to enter the lower portion of the handle A. This coupling B lies between the laterally-bent portions (the ears) of the straps $h$ and $h'$ and is held in place by means of the pivot $i$, which pivot connects the before-mentioned three principal parts and constitutes the pin of the hinge.

The cover F, with which I incase my landing-net, is not unlike an umbrella-cover, hence needs no detailed description herein.

In practice when I desire to use my landing-net I unbutton the band $j$ of the cover F, which band secures the upper end thereof to the handle A, or untie a string, which may be substituted therefor, and remove the cover F by pulling it downward and off from the lower end of the handle A.

I next untie the string with which I have secured the rolled-up net to the bars e and to the handle A and shake loose the cordage. I then unscrew the handle A from the shorter portion B² of the coupling B and withdraw it from the cordage, then reverse the operation and screw it onto the longer portion B³ of the coupling B, thus forming a suitable handle for my device, and finally I grasp the parallel bars e and e', to which the cordage is affixed, and deflect them, forming them into two semicircular bows, the free ends of which I now unite by slipping the free end of the bar e' underneath the overlapped ears k, which secure the clasp E to its bar e, allowing the pin f thereof to enter the lateral perforation g of the said bar e' and the said bar e to rest between the guards l of the clasp E, which completes the operation and provides a light, strong, and convenient landing-net. When through landing my fish and preparing to decamp, I unclasp the bars e and e', when (through the elasticity of the metal) they will assume straight and parallel positions. I then unscrew my handle A from the longer threaded portion B³ of the coupling B, and, reversing the bars e, screw it onto the shorter threaded portion B² thereof, wind my net (the cordage) round the bars e and the handle A, where I secure it by means of strings affixed to the middle portion of the said net, draw the cover F over the whole, letting the pin portion B⁴ of the coupling B protrude through the hole or eyelet J thereof, button the band j around the handle A directly above the annulet C', thus hiding my net and giving to the whole the appearance of an umbrella.

My purpose in having the handle A hollow and made of aluminium is twofold—first, to provide a buoyancy-chamber to float the net should it by chance slip from the hand or drop from the boat, and, second, to provide a receptacle for the disconnected sections of a fishing-rod, for it is evident that the buoyancy-chamber may be utilized for such or similar purposes.

In the modified construction shown in Figs. 8 to 14, inclusive, I show substantially the same construction as that shown in Figs. 1 to 7, inclusive, save the hinge-joint G and the coupling H. This hinge G, like the other, consists of three principal parts—viz., the two straps O and the link L, to which they are pivoted. The straps O are similar in construction, are attached to their respective bars in like manner, and produce identically the same results as those above described. The link L, to which the straps O are pivoted, is vertically pierced and interiorly threaded to receive an exteriorly-threaded pin in contradistinction to the coupling B, having exteriorly-threaded projecting pins adapted to be received into an interiorly-threaded socket. The coupling H consists of a pin m, extending longitudinally from the lower end of the handle I, a portion of which is exteriorly threaded, thus adapting it to be screwed into the link L of the hinge G. The handle I is fashioned at its lower end with the annular recess n, which recess encircles the upper portion of the before-named pin m. This annular groove or recess n is adapted to receive obliquely-extending portions K' of the straps O of the hinge G when the bars to which they are attached shall have been distended to form a hoop, as shown in Fig. 13. This handle may also be reversed and screwed into the under side of the link L, as shown in Fig. 10. A further description of the method of using this modified construction would be but a repetition of what was hereinbefore given, as it is identical therewith.

What I claim as new, and desire to secure by Letters Patent, is—

1. In a landing-net, a hoop composed of resilient bows, a pivot-block to which the inner ends of said bows are pivotally affixed, exteriorly-threaded pins extending laterally from opposite sides of the said pivot-block, and an interiorly-threaded handle adapted to alternate engagement with the said exteriorly-threaded pins, substantially as shown and for the purpose specified.

2. In a landing-net frame, the combination with the resilient bows forming the hoop thereof, the hinge-coupling connecting the inner ends of the said bows, and a handle detachably connected with the said hinge-coupling; of the clasp E connecting the outer ends of the said resilient bows, said clasp being fashioned with overlapping ears adapted both to secure it to the outer end of one of the said bows, and to receive the free end of the other one of the said bows, with the lugs l adapted to guard the last-named bow and to prevent lateral movement thereof, and with the pin f adapted to enter a lateral opening g in the said last-named bow to prevent a longitudinal movement thereof.

3. A landing-net formed of an interiorly-threaded handle A, a net-supporting hoop, and a hinged coupling comprising the pivot-block B having oppositely-extending exteriorly-threaded pins adapted to interchangeable engagement with the interiorly-threaded handle, A, substantially as shown and described and for the purpose specified.

4. In combination with an interiorly-threaded handle, a landing-net having a hinge-screw coupling, the pivot-block having oppositely-extending exteriorly-threaded pins adapted to interchangeable engagement with the interiorly-threaded handle, one of said threaded pins being fashioned with a longitudinally-extending reduced portion substantially as shown, and for the purpose specified.

5. In a landing-net, the tubular handle, having an interiorly-threaded lower end and a closed upper end; and a hinge-coupling, an exteriorly-threaded pivot-block adapted to engage the lower end of the handle, a plug intermediate the said threaded lower end and the said closed upper end; thereby forming the air-tight chamber $c$, substantially as shown and for the purpose specified.

6. In a landing-net frame having resilient bows connected at their inner ends by means of a hinge-coupling, and a handle adapted for engagement with the said hinge-coupling; the clasp E connecting the outer ends of the said resilient bows, said clasp being fashioned with overlapping ears $k$ adapted to secure the said clasp E to its bow $e$, and to receive the free end of the other bow $e'$, substantially as shown and described.

JESSE C. HERITAGE.

Witnesses:
 E. C. MORSE,
 A. T. FAY.